Figure 1:
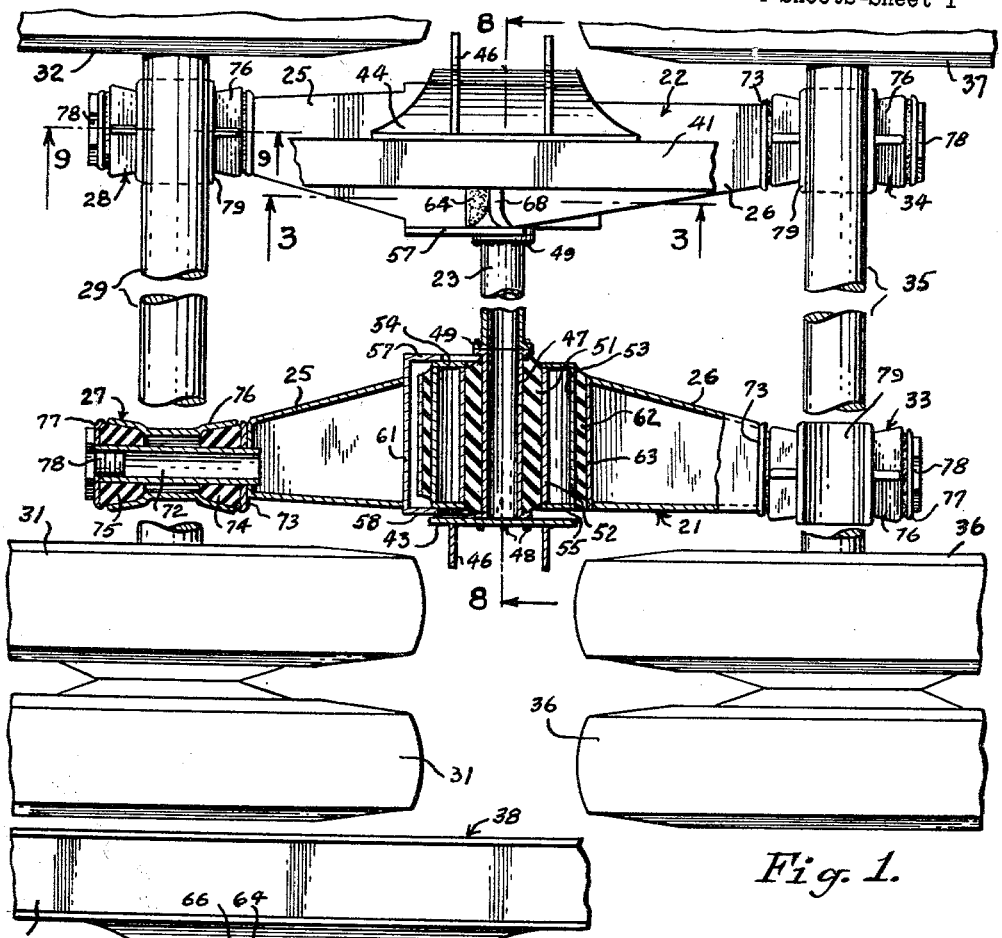

March 2, 1965

E. H. WILLETTS 3,171,668

ANTI-ROLL TANDEM AXLE TORQUE-REACTIVE VEHICLE SUSPENSION

Filed Dec. 13, 1961

4 Sheets-Sheet 1

INVENTOR
*Elwood H. Willetts*

BY *L. S. Saulsbury*

ATTORNEY

March 2, 1965  E. H. WILLETTS  3,171,668
ANTI-ROLL TANDEM AXLE TORQUE-REACTIVE VEHICLE SUSPENSION
Filed Dec. 13, 1961  4 Sheets-Sheet 2

INVENTOR
*Elwood H. Willetts*
BY *L. S. Saulsbury*
ATTORNEY

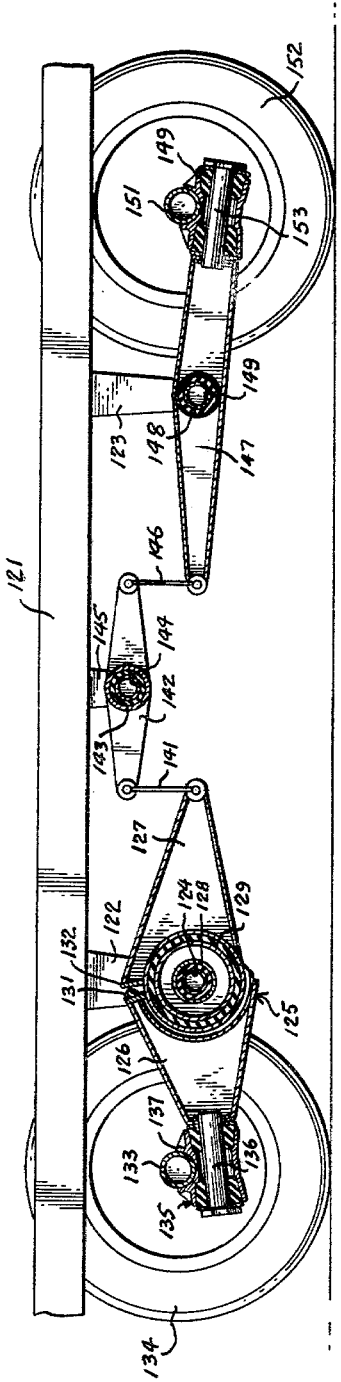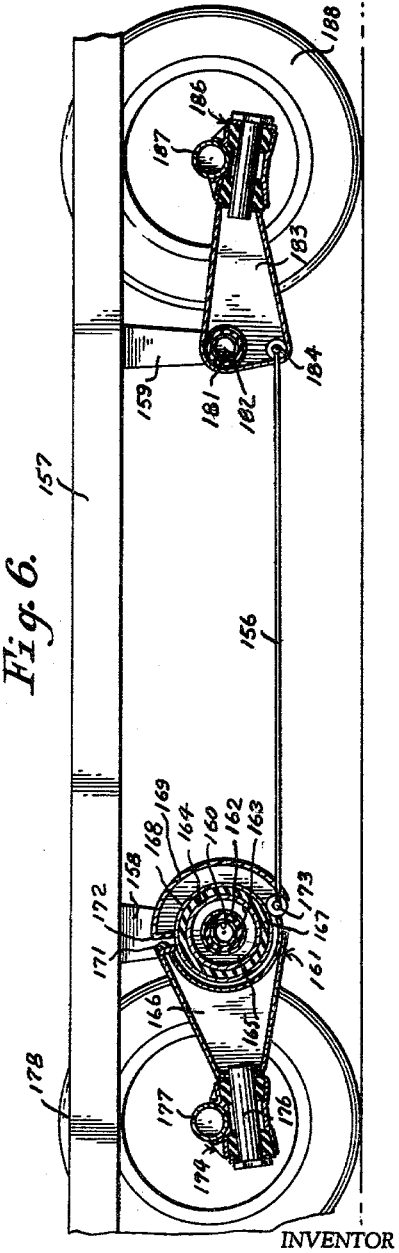

March 2, 1965  E. H. WILLETTS  3,171,668
ANTI-ROLL TANDEM AXLE TORQUE-REACTIVE VEHICLE SUSPENSION
Filed Dec. 13, 1961  4 Sheets-Sheet 4
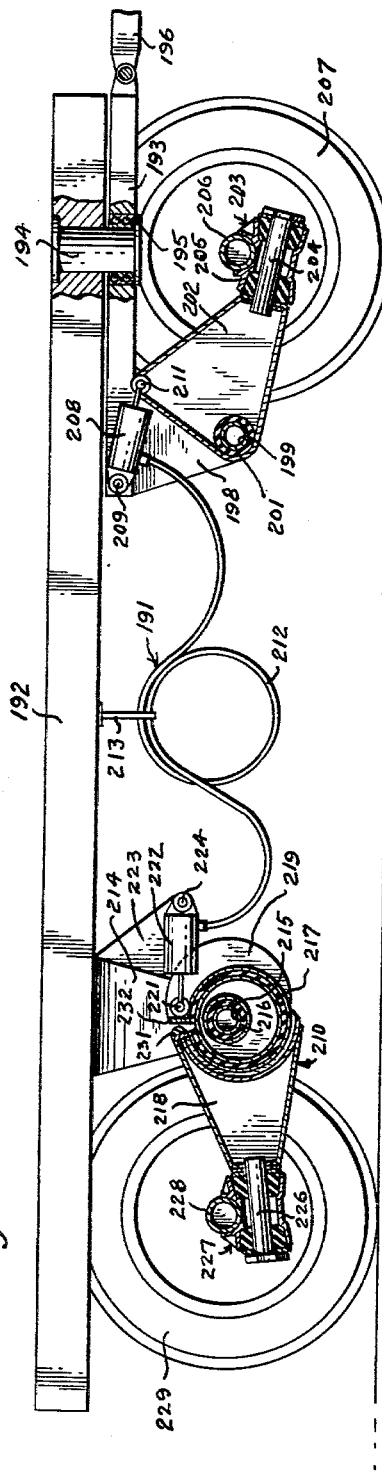
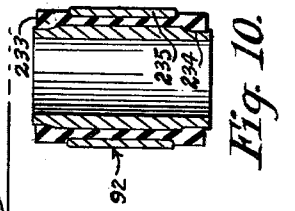
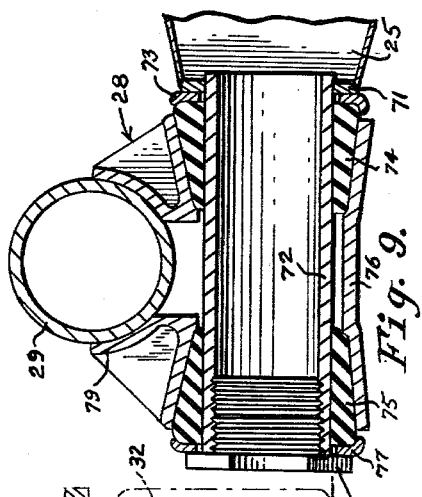
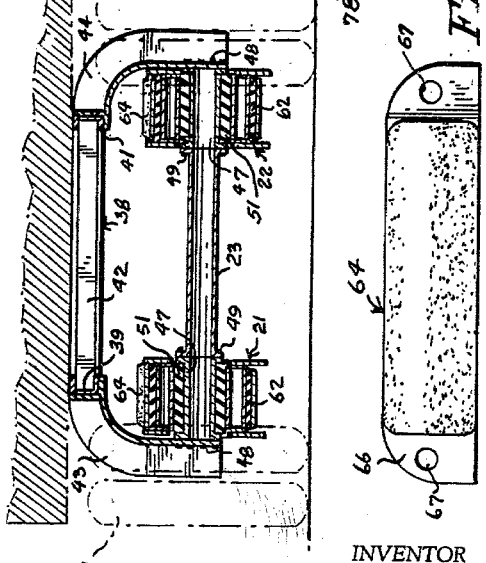
INVENTOR
*Elwood H. Willetts*
BY *L. S. Saulsbury*
ATTORNEY

United States Patent Office 3,171,668
Patented Mar. 2, 1965

3,171,668
ANTI-ROLL TANDEM AXLE TORQUE-REACTIVE
VEHICLE SUSPENSION
Elwood H. Willetts, 320 Kenmore Road,
Douglaston 63, N.Y.
Filed Dec. 13, 1961, Ser. No. 158,979
6 Claims. (Cl. 280—104.5)

This invention relates to an opposing arm, tandem axle, torque-reactive suspension for vehicles and more particularly of a nested rubber bushing type such as described and claimed in this inventor's United States Patents 2,951,710 and 3,013,808.

It is the principal object of the present invention to provide a tandem axle, torque-reactive, low frequency load cushioning vehicle wheel suspension between tandem transverse axles which has means for controlling the transverse roll of the vehicle.

It is another object of the present invention to provide an opposing arm, tandem axle, resilient bushing, torque-reactive, wheel suspension system in which the opposite ends of the transverse suspending axles will have greater freedom of vertical movement relative to each other than is ordinarily obtained from the accepted connecting means between a tandem suspension and its supporting axles.

It is another object of the present invention to provide an opposing arm, tandem axle, torque-reactive wheel suspension for vehicles that has an axle connection of the opposing arms with the transverse axles that will give freedom of vertical movement of the opposite ends of tandem arranged transverse axles.

It is still another object of the present invention to provide an opposing arm, tandem axle, torque-reactive, rubber bushing suspension structure with which increased transverse axle spacing, wide spread axle bogies, four wheel trailer suspensions, and steerable front axles can be had.

It is a further object of the present invention to provide an opposing arm, tandem axle, resilient bushing torque-reactive suspension structure in which the torsional reactive resilient bushing of one of the opposing arms of the suspension structure is eccentrically interconnected with the reactive bushing of the other arm to control the additional torsional reaction of the bushing of the one arm.

Still further objects of the present invention are to provide opposing arm, tandem axle, torque-reactive vehicle wheel suspension structure for vehicles, having the above objects in mind, which is of simple construction, constructed of a minimum number of parts, easy to assemble, gives maximum cushioning action, compact, has long life, effective and efficient in use.

Figure 3:
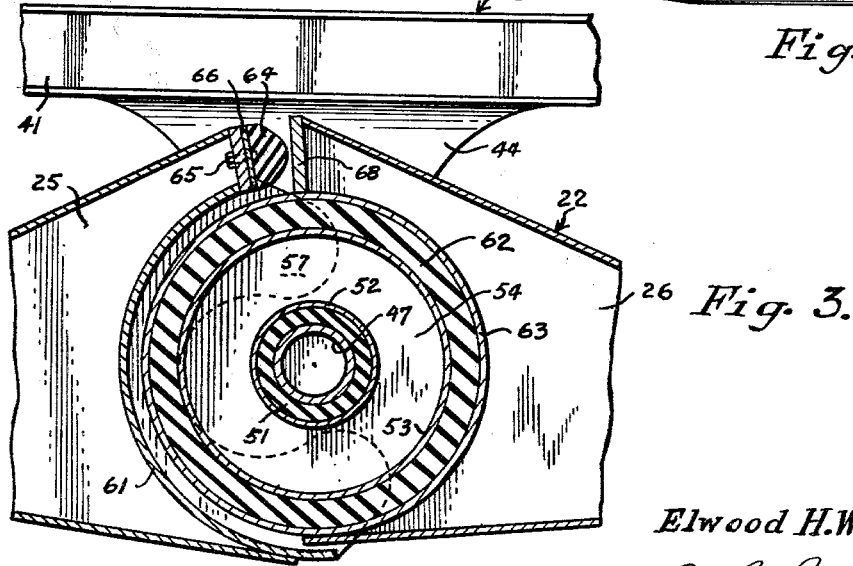
Figure 2:
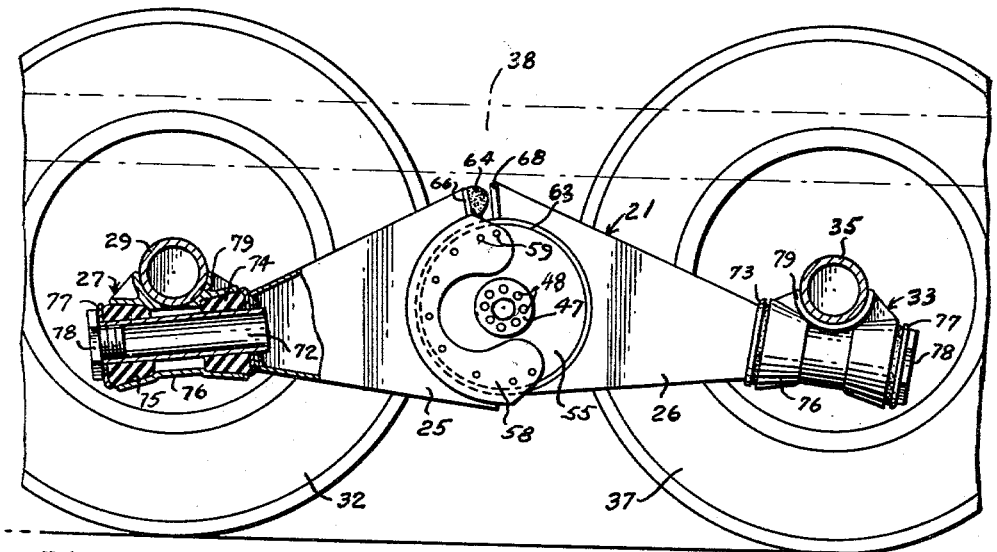
Figure 4:
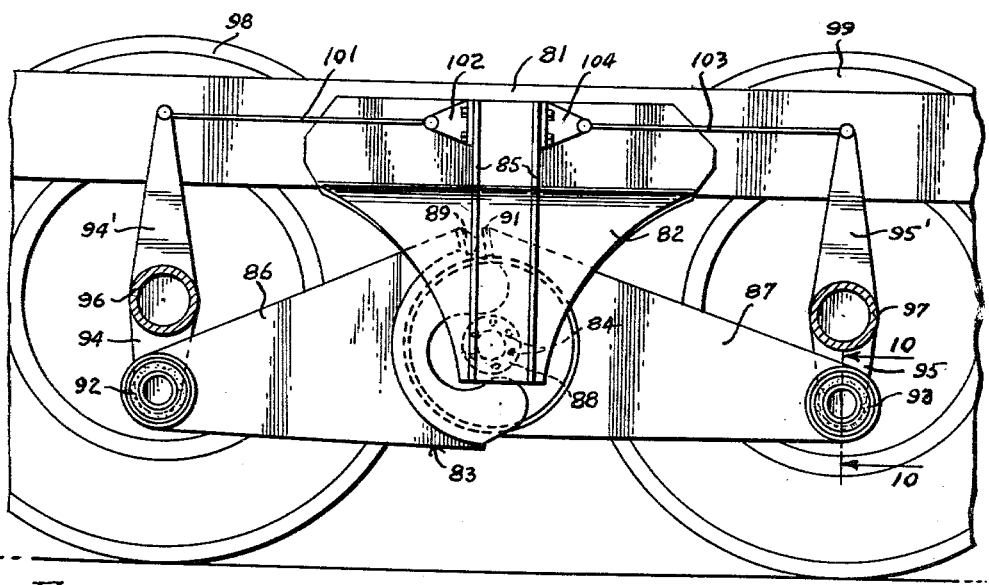

For a better understanding of the invention, reference may be had to the following detailed description taken in connection with the accompanying drawing, in which FIGURE 1 is a fragmentary top plan view of a tandem axle opposing arm torque-reactive vehicle wheel suspension system for a vehicle bogie constructed and assembled according to one form of the invention with one of the opposing arm torque-reactive structures being shown in section, FIG. 2 is a fragmentary side elevational view of this opposing arm torque-reactive vehicle wheel suspension with the axle connection of one of the arms being shown in section, FIG. 3 is an enlarged fragmentary longitudinal sectional view of one of the torque-reactive suspension structures as viewed on line 3—3 of FIG. 1, FIG. 4 is a side elevational view of the opposing arm tandem axle, torque-reactive vehicle suspension structure as applied to a standard parallelogram torque linkage wheel suspension system and according to another form of the invention, FIG. 5 is a longitudinal sectional view of the opposing arm tandem axle, torque-reactive, wheel suspension used to provide a wide spread tandem axle bogie for a truck or trailer according to still another form of the invention, FIG. 6 is a longitudinal sectional view of an opposing arm, tandem axle, torque-reactive suspension system used to provide a wide spread tandem axle bogie in which the wheel supporting arms are longitudinally extended by tension rods according to a further form of the invention, FIG. 7 is a longitudinal sectional view of an opposing arm, tandem, axle, torque-reactive wheel suspension used to provide a wide spread tandem axle suspension in which the wheel arms are joined by a hydraulic connection to permit one of the wheel arms to be located upon a steerable axle, the opposing arm suspension having eccentrically nested rubber bushings and according to a still further form of the invention, FIG. 8 is a transverse vertical sectional view of the tandem axle vehicle bogie shown in FIG. 1 and as viewed generally on line 8—8 thereof, FIG. 9 is an enlarged longitudinal sectional view of the opposing tapered bushing connection of a suspending axle with a longitudinally-extending arm of a wheel suspension structure and as viewed on line 9—9 of FIG. 1, FIG. 10 is a transverse sectional view of a rubber bushing used with certain of the forms of the invention for the connection of the axle to a suspension arm, for example, as viewed on line 10—10 of FIG. 4, and FIG. 11 is a transverse front face view of a resilient anti-roll control bumper that is disposed between the opposing arms of a torque-reactive structure to control the transverse roll of the vehicle.

Referring now particularly to FIGS. 1, 2, 3 and 8, there is shown a wheel suspension bogie for a vehicle, in which opposing arm, tandem axle, torque reactive wheel suspension structures 21 and 22 are employed. These opposing arm suspension structures are here shown centrally tied together through a cross sleeve connection 23. Each of the suspension structures 21 and 22 have a forward wheel axle suspension arm 25 and an opposing rear wheel axle suspension arm 26. The forward suspension arms 25 are connected through tapered resilient ring assemblies 27 and 28 to which a forward wheel cross axle 29 bearing right and left dual tire wheels 31 and 32, is secured. On the opposing rear wheel suspension arms 26 are oppositely tapered resilient ring assemblies 33 and 34 that support a rear cross axle 35 with dual tire wheels 36 and 37.

It is not essential that the axle connect to an arm end by the resilient tapered bushings 27, 28 extend across the width of the vehicle, as assemblies 27, 28 are also intended to connect stub axles carrying either single or dual tires on each end of each stub axle.

This wheel suspension bogie is connected to a trailer frame 38 between side frame members 39 and 41 that are joined together by cross frame members 42 through depending side end brackets 43 and 44 which extend upwardlly from the sides of the wheel suspension structure 21 and 22 and are secured to the respective vehicle frame members 39 and 41 as by welding. Other brackets can be used, if desired, intermediate the suspension structures and connected to the cross frame member 42. The side end brackets 43 and 44 are respectively upwardly and inwardly curved and reinforced by vertically-extending parallel ribs 46 welded thereto. The torque-reactive wheel suspension structures 21 and 22 respectively have central mounting shafts 47 having end flanges to which the brackets 43 and 44 are secured by bolts 48. The inner ends of the mounting sleeves 47 are joined by their flanges and bolts 49 with flanges of the cross sleeve connection 23 that ties the suspension structures 21 and 22 together.

Surrounding and adhered to the central sleeve 47 of each suspension structure is a primary tubular rubber bushing 51. On the outer surface of this primary bushing there is adhered a concentric sleeve 52. This sleeve 52 is connected to an encircling sleeve 53 by inner and outer end plates 54 and 55 that are respectively connected through C-shaped side plates 57 and 58 by bolts 59, and a curved tie plate 61 to wheel arm 25.

Adhered to the sleeve 53 is a secondary tubular rubber bushing 62 and adhered to it is an outer sleeve 63 to which the rear suspension arm 26 is rigidly secured. With this structure in this manner, it should be apparent that the suspension arms 25 and 26 can be cushioned radially, longitudinally, angularly and torsionally with respect to its mounting sleeve and to each other.

In order that the resilient bushings 51 and 62 will not be unduly deflected as the arms 25 and 26 are moved upwardly, as is effected upon the vehicle turning a corner or taking a curve in the road with the weight being shifted by centrifugal action toward the outer side of the corner or curve, a transversely-extending rubber bumper 64, FIGS. 3 and 11, is secured to the forward wheel suspension arm 25 by fastening bolts 65 and its assembly plate 66 with holes 67 therein to accommodate the bolts. This bumper 64 will engage a transversely-extending pressure plate 68 fixed to the rear wheel arm 26. This arrangement thus constitutes an anti-roll means for the vehicle by limiting the deflection of the forward and rear wheel arms 25 and 26. The roll of the vehicle is thereby controlled. The suspension structures 21 and 22 themselves are tied through the cross sleeve 23 and made rigid with the vehicle frame 38 so that as units there is no movement in any direction relative to each other.

The forward and rear wheel axles 29 and 35 are mounted through the tapered resilient ring assemblies 27, 28 and 33, 34 carried respectively on the respective forward and rear wheel arms 25 and 26 of the torque-reactive structures 21 and 22. Each of the wheel arms 25 and 26 have an end plate 71 welded thereto and extending longitudinally therefrom is a sleeve extension 72, FIGS. 1, 2 and 9. These parts are made rigid with the arm through adequate welding of the parts to each other and to the arm. This sleeve 72 carries a washer 73 against which a tapered resilient ring 74 is assembled. On the outer end of the sleeve extension 72, there is an opposing tapered resilient ring 75 and encircling and carried upon these tapered rings there is an outer sleeve 76. A washer 77 is fitted over the outer end of the sleeve extension 72 and a bolt 78 is threaded into the end of the sleeve to secure the assembly upon the wheel suspension arm. The outer sleeve 76 has an integral upwardly curved tapered pad 79 for receiving the wheel axle 29 or 35 and to which the axle is welded. Through these oppositely tapered ring assemblies, the axle is resiliently connected to the ends of the wheel suspension arms and at the opposite sides of the vehicle.

Where but one of the tandem wheel axles is a drive axle and its companion a dead axle, and/or, where both are trailing axles, the free ends of the suspension arms are connected to all such axles so that drive and brake torque on the drive axle and brake torque on the trailing axles may be transferred through said opposing suspension arms and the torsional forces neutralized at the suspension bracket attached to the vehicle frame. This is accomplished by provision of a sleeve 72 longitudinally protruding from each free end of the respective suspension arms, the sleeve 72 passing through the outer sleeve 76 therefor attached to the underside of the wheel axle 29 or 35 and insulated therefrom by means of oppositely tapered resilient bushings disposed fore and aft the wheel axle within outer sleeve 76. The tapered resilient bushings 74 and 75 are of adequate form and of suitable material to insulate some of the tire vibrations and dampen the amplitude of the suspension displacement. The bolt 78 threaded into the end of suspension arm sleeve 72 secures the assembly and affords selective compression of the tapered resilient bushings 74 and 75.

Drive and brake torque-reactions result in angular deflections in the tapered resilient bushings, while radial deflections in the vertical plane result from the static and dynamic loads. As opposite ends of a cross axle oscillate oppositely and simultaneously in relation to the vehicle frame, the tapered bushings are deflected torsionally, angularly, and radially from a horizontal plane.

The use of low frequency rubber torsion bushing type of spring suspension in dry cargo vehicles subject to overall height limitations has been restricted by the increased static versus dynamic deflection of rubber stressed in torsional shear. Unlike steel springs wherein static and dynamic deflections are practically uniform the ratio of static to dynamic deflection in a rubber torsion spring varies increasingly with the static shear modulus of the rubber, with the ratio ranging generally between 1.2 to 1 and 1.5 to 1.

Cargo vehicle suspensions generally provide low displacement between axle and frame with resultant high frequency hard riding, driver discomfort and cargo damage. High displacement with resultant low frequency results in excessive transverse roll, especially in vehicles with high center of gravity when there is a change in direction of vehicle travel. The torsion springs or bushings outwardly of the center of the road curve are depressed and springs inwardly thereof are torsionally relieved through the action of centrifugal force acting at the center of gravity which is higher than the suspension torsion springs. This force creates a static load on the outward springs (whether steel or rubber), which, of rubber having a static to dynamic deflection of 1.25 to 1 is 25% less resistant to such roll force than steel springs of the same frequency.

To further complicate the problem of roll control in a rubber torsion suspension, the static load-deflection graph is not a straight line, and the design load point on such a graph is on the downward slope of a curve portraying inch pounds torsional resistance per degree per degree. Beyond the design load point of angular deflection the torsional resistance per degree of deflection diminishes (until near the end of a usable deflection angle).

With a static-dynamic deflection ratio of 1.25 to 1 in a rubber torsion bushing stressed in torsional shear providing a natural frequency of 94 cycles per minute, with a static deflection is five inches and an angular deflection of eleven degrees, the relative torsional resistance at fifteen degrees angular deflection is but ninety-seven percent per degree per degree. The dynamic deflection is but four inches at above stated five inch static deflection. According to this present invention, the torsionally reactive opposing suspension arms stress the tubular rubber spring or bushing in opposite directions from its inner and outer surfaces simultaneously thereby reducing the angle of deflection of each opposing arm one half of the aforementioned eleven degrees spring deflection at static design load, thus the actual frame deflection (from mold position of free rubber to design load) is but 2.5 inches and the dynamic deflection two inches for a ninety-four cycle per minute frequency.

Heretofore, the combinations of rubber torsion and compression springs whose combined resistance throughout their usable deflection range combine to support the suspension load and wherein the torsion spring is wound from either its inner or outer periphery only and not from both and oppositely as done in this present construction, thus their displacement between axle and frame is twice that of this construction for a given frequency.

The novelty of this invention lies in the belated contact of a rubber compression bumper 64 of variably increasing spring rate disposed between the opposing suspension arms 25 to 26 to first, offset the basic ratio of static to dynamic deflection of the rubber torsion spring or bushing 62 only after design load angular deflection occurs in said spring. Secondly, to offset the declining resistance of the rubber torsion spring 62 at angular deflections beyond design load, and thirdly, to provide the total resistance required to selectively control roll in a tandem axle suspension of low frequency.

According to this invention, when the predetermined limit has been reached on the roll control compression spring bumper 64 the opposing suspension arms may yet oscillate as a pivoted rigid beam connected to both axles of the suspension regardless of the distance between said axles. The roll force is evenly distributed between both axles of the suspension with corresponding reduction to one half the roll load on the tires.

In FIG. 4, the free ends of the suspension arms 86 and 87 are connected to the respective axles by means of the single rubber bushings 92, 93 below and paralleling the axis of said axles, in which case drive and brake torque is taken to vehicle frame at a point above axle center from which the reaction on vehicle frame is longitudinal rather than vertical as shown in FIG. 4 to be presently described in detail. Parallelogram connections have long been used throughout the trucking industry to afford uniformity of joint angles in the interconnecting propellor shaft between two drive axles of a tandem axle bogie.

In FIG. 4, a vehicle frame 81 and vertically-curved brackets 82 depending therefrom at the opposite sides thereof and to which there is fixed opposing arm torque-reactive structures 83 by means of fastening bolts 84, there being one structure at each side of the frame as above described. These brackets 82 are reinforced with parallel ribs 85. Each of the opposing arm torque-reactive structures 83 having forward and rear wheel suspension arms 86 and 87 and a central mounting sleeve 88 which receives the fastening bolts 84 in the same manner as with the previous form of the invention. Its wheel arms 86 and 87 are interconnected through concentric rubber bushings as above described and an anti-roll bumper 89 on suspension arm 86 comes into play, as when the static load has overcome the rubber bushings of the suspension structure and the bumper is compressed by a pressure plate 91 on rear suspension arm 87.

The forward and rear wheel suspension arms 86 and 87 are respectively connected by simple laterally-extending rubber bushings 92 and 93 of the type best shown in FIG. 10, to respective vertically-extending hanger brackets 94 and 95. These vertically-extending hanger brackets carry transversely-extending forward and rear wheel axles 96 and 97 that extend across the vehicle frame 81 and carry respectively tire wheels 98 and 99.

Brake and drive torque-reactions are taken through torque arms 94′ and 95′, torque rods 101 and 103 to the frame by brackets 100 and 102.

The highway laws of various states allow gross axle loads according to the wheel base, for example, a load of 32,000 pounds is permitted for a forty-eight inch wheel base while a load of 38,000 pounds is allowed for a wide spread bogie 109 inch wheel base. With the present invention, it is feasible to apply the same style and capacity torque-reactive bushings for both of said aforementioned loads by simply adding primary bushings. This is done while preserving the same angle of deflection and frequency of vibration with the increased load.

In FIG. 5, a vehicle frame 121 has two longitudinally-spaced depending brackets 122 and 123. Extending transversely between the depending brackets 122 is a cross sleeve 124 that carries tandem axle wheel suspension structures 125, only one being shown and each of which having a forwardly-extending arm 126 and a rearwardly-extending arm 127 that are connected together by nested bushings 128 and 129 in a manner above described and upon the torsional resiliency of these arms being effected a bumper 131 will engage a pressure plate 132 to render the unit relatively stiff so that it pivots as a beam on the cross sleeve 124. A wheel axle 133 extends between the opposite sides of the frame and has vehicle supporting wheels 134 thereon. This wheel axle 133 is connected to a forward end of the suspension arms 126 by a tapered resilient ring assembly 135 on an arm extension 136 and which has an outer sleeve 137 to which the cross axle 133 is fixed so that it lies above the arms 126 and their extensions 136.

The rearwardly extending arm 127 is connected by a vertically-extending link 141 to transfer rocker beams 142 connected by a primary bushing 143 and a cross shaft 144 supported on drop brackets 145 depending from the frame 121. Drop link 146 extending from the rocker beams 142 are connected to the forward end of wheel axle-supporting beams 147. These beams 147 are connected by primary bushings 148 and a cross sleeve 149 supported on the lower ends of the depending brackets 123, longitudinally spaced from the brackets 122 to provide the additional wheel base. On the rear arm of the beams 147 are oppositely tapered resilient ring assemblies 149 to which is fixed a wheel axle 151 and wheels 152. These resilient ring assemblies are of the same type as described above in detail and are supported upon rearwardly-extending extensions 153 rigidly connected to the rear ends of the wheel axle supporting beam in rear of the primary bushings 148.

It will thus be seen that there has been provided means for extending the wheel base with the torque-reactive structures simply by the use of additional frame brackets carrying primary bushings 143 and 148 and rocker beams 142 and arms 147. Any load imparted to the forward wheels 134 will react on the rear wheel 152 only through torsional deflection of the bushings 128, 129, 143, 148 and for greater than design loads upon compression of the bumper 131 by the pressure plate 132. Likewise, any slight motion imparted to the rear wheel 152 may be absorbed through the bushings and without being transferred to the forward wheel 134. Upon the vehicle changing its direction of travel and creating a transverse roll, both opposing arms of the outwardly disposed structure will be depressed to engage the roll control part 131, 132.

In FIG. 6, there is shown an optional arrangement for effecting the transfer of force between spread wheel arms by means of a tension rod 156. With this form of the invention, a vehicle frame 157 has only two pairs of depending brackets 158 and 159 spaced from one another at a distance depending upon the wheel base that is desired. Between the forward depending brackets 158, there extends a cross shaft 160 which has two torque-reactive structures 161 secured to the same, one at each side thereof. Each torque-reactive structure has a primary rubber bushing 162 adhered to the cross shaft, concentric sleeves 163 and 164, and end plates 165 joining the sleeves together and connecting them with a forwardly-extending axle-supporting arm 166. Adhered to the sleeve 164 is a secondary rubber bushing 167 to which there is secured an outer sleeve 168 and an opposing member 169, not in the form of a wheel supporting arm but operative in a similar torque-reactive manner. The axle supporting arm 166 has an anti-roll bumper 171 that will engage a pressure plate 172 of the opposing member 168. The tension rod 156 is connected to the lower end of the opposing member 168 at 173. The forward end of the axle-supporting arm 166 has an oppositely tapered resilient ring assembly 174 carried on extension sleeve 176 and which supports a wheel axle 177 and road wheels 178, all in the manner as above described. On the lower end of the depending bracket 159 are primary rubber bushings 181 fixed respectively to the opposite ends of a cross shaft 182 and that support rearwardly-extending wheel axle-supporting arms 183. The tension rod 156 is connected to the lower end of the arm 183 at 184. On the rear end of each wheel axle-supporting arm 183 is an oppositely tapered resilient ring assembly 186 that resiliently carries a wheel axle 187 and road wheels 188.

It should now be apparent that there will readily be a transfer of force from one pair of road wheels to their opposing pair of wheels, with the rubber bushing 167 resiliently absorbing and storing the opposing force between the torque-reactive axles. The bumper 171 will control the roll of the vehicle on being compressed by the pressure plate 172. The ends of the wheel axles 177 and 187 will be resiliently connected to arms 166 and 183 by the tapered ring assemblies 174 and 186.

In FIG. 7, there is shown an assembly utilizing a hydraulic system 191 for the transfer of the opposing force between the wide spread road wheels. This hydraulic system adapts the wide spread wheel base suspension for use where there are wheels that are steerable. According to this form of the invention, a vehicle body 192 has a steerable truck 193 connected to the forward end of the body through a vertically-extending depending post 194 and ball bearing assembly 195. The steerable truck can be connected by a forwardly extending hitch 196 to another vehicle.

The steerable truck 193 has depending brackets 198 at its rear end between the lower ends of which a transverse shaft 199 is fixed. Fixed to this shaft 199 through primary rubber bushings 201 are spaced wheel axle-supporting arms 202 that extend forwardly and are resisted against upward movement by rubber bushings 201 and pressure in the hydraulic system 191. The forward ends of the axle-supporting arms 202 have oppositely tapered resilient ring assemblies 203 carried on a central extension 204 and an outer sleeve 205 thereof is rigidly connected to a transversely-extending wheel axle 206 on the opposite ends of which road wheels 207 are journalled.

A hydraulic cylinder device 208 forming a part of the hydraulic system is pivotally connected to the rear end of the steerable truck 193 by a pivot pin and its other end is pivotally connected to the upper end of the axle-supporting arm 202 at 211. Any load on the forward wheels 207 is resisted by hydraulic pressure through a free hose 212 that is intermediately supported by a hanger 213 depending from the vehicle body 192.

Near the end of the vehicle body 192, there are depending brackets 214 that support a cross shaft 215 on the opposite ends of which are resiliently mounted torque-reactive structures 210. Each of these structures 210 have eccentrically-arranged primary and secondary rubber bushings 216 and 217, a rearwardly-extending wheel axle-supporting arm 218 and an opposing torque-reactive member 219. The axle supporting arm and opposing member are interconnected with one another through the rubber as above described in connection with the other forms of the invention. The opposing torque reactive member 219 is connected by a pivot pin 221 to a cylinder device 222 that is pivotally anchored to a forward extension 223 of the depending bracket 214 by a pivot pin 224 and the hose 212 extending from the cylinder device 208 of the steerable truck 192. Through this hydraulic system the torsional resistance of rubber bushing 217 interconnects opposing wheel supported arms 202 and 218.

Each of the rear axle-supporting arms 218 have a sleeve extension 226 on which an oppositely tapered resilient ring assembly 227 is connected in the manner above described and which resiliently supports a rear wheel axle 228 and rear wheels 229. If the deflection of either or both of the arms 202, 210 on one side of the vehicle exceeds the predetermined angle of bump or roll, an anti-roll bumper 231 on the axle-supporting arm 218 will be compressed by a pressure plate 232 to provide a pivoted semi-rigid beam structure betwene axles 206 and 228 and prevent further deflection of rubber torsion bushing 217 on respective sides of vehicle to limit the transverse roll of the vehicle. The primary bushings 92 and 93 are preferably constructed as shown in FIG. 10 with a rubber sleeve 233 compressively retained between inner and outer sleeves 234 and 235.

In all of these instances where the anti-roll bumper engages the pressure plate of an opposing arm or member the bushings of the torque-reactive structures are thereby restrained from further angular deflection to control the transverse roll of the vehicle. It will be noted in FIG. 7 that the secondary bushing 215 has been disposed eccentrically of the cross shaft 215 and primary bushing 216 so as to change the force of the bonded primary bushing 216 reacting at the wheel end of axle supporting arm 218.

Where primary bushing 216 is disposed fore or aft the center of secondary bushing 217, the effective arm length through which the torsional force of bushing 216 is applied to arm 218 is increased or decreased. Where bushing 216 is disposed above or below center of bushing 217 the result is to vary the vertical center of suspension in its effect on transverse stability.

It is understood that while nested rubber-like tubular bushings are shown, the bushings may comprise metal helical twist springs or a combination of such metal and rubber.

While various changes may be made in the detailed construction, it shall be understood that such changes shall be within the spirit and scope of the present invention as defined by the appended claims.

What is claimed is:

1. In an opposing arm torque-reactive wheel suspension structure, a first wheel suspension arm, a second wheel suspension arm opposed to the first arm, an inner mounting shaft, a sleeve around said shaft and spaced therefrom, a torque-reactive bushing bondedly interconnecting said shaft and said sleeve, a second torque-reactive bushing bondedly interconnecting said sleeve and said second wheel suspension arm, and means to further resist angular motion between said inner shaft and said second suspension arm.

2. An opposing arm torque-reactive wheel suspension structure as defined in claim 1, and said further resistance means comprising a progressively resisting bumper carried on one of the suspension arms and engageable with the opposing arm.

3. In combination, a vehicle frame, laterally-spaced opposing arm torque-reactive suspension structures secured to the frame, each of said suspension structures comprising oppositely-extending wheel suspension arms, an inner mounting shaft secured to the frame, a sleeve around said shaft and outwardly spaced therefrom, said sleeve being secured to one of said suspension arms, a first torque-reactive bushing bondedly interconnecting said inner shaft and said outwardly spaced sleeve, a second torque-reactive bushing bondedly secured to said sleeve and connected to the other of said arms, tandem-arranged longitudinally spaced wheel supporting axles, resilient means for connecting said axles to the free ends of said suspension arms, and means to reduce running or traveling imbalance of transverse static deflection between said laterally spaced suspension structures.

4. The combination as defined in claim 3, and the said means to reduce running or traveling imbalance of transverse static deflection being progressively increasing.

5. The combination as defined in claim 3, and said means for connecting the wheel axles to the free ends of the suspension arms being torsionally, radially, angularly and axially resilient.

6. The combination as defined in claim 5, and said resilient means for connecting the wheel axles to the suspension arms including a sleeve extension of the suspension arm, oppositely tapered resilient rings surrounding said sleeve extensions, an outer sleeve having internal conical end surfaces and secured to the axle, said rings seated in the ends of the sleeve compressively.

References Cited in the file of this patent

UNITED STATES PATENTS

| | | |
|---|---|---|
| 1,099,646 | Gresser | June 9, 1914 |
| 2,149,297 | Knox | Mar. 7, 1939 |
| 2,176,971 | Klotsch | Oct. 24, 1939 |
| 2,716,040 | Barenyi | Aug. 23, 1955 |
| 2,814,501 | Clark | Nov. 26, 1957 |